Aug. 10, 1965    M. MAURITZ    3,199,241
BITE INDICATOR
Filed April 2, 1963

INVENTOR.
Michael Mauritz
BY
HIS ATTORNEYS 3,199,241
BITE INDICATOR
Michael Mauritz, 509 James St., Turtle Creek, Pa.
Filed Apr. 2, 1963, Ser. No. 269,951
6 Claims. (Cl. 43—17)

This invention relates to a bite indicator, and more particularly to an indicator device which may be used on any fishing rod without modifying the structure of the rod. It is common in ice fishing and normal still fishing to support a rod or a plurality of rods adjacent the water until a fish is hooked, at which time the fisherman takes up the rod and plays the fish. By utilizing an indicator means on the rod to indicate when the bait has been taken, it is possible for the fisherman to set all of his lines without paying particular attention to any specific line until he knows that a fish has taken the bait. In order to permit the use of standard rods in conjunction with an indicator, it is necessary that the indicator be light in weight and easily placed on and removed from the rod. Also, the indicator device should be unitary in order to permit its placement at any position on the rod so as not to interfere with the normal use of the rod and to assist in using the indicator device with any type of rod regardless of the specific rod structure.

My invention provides a bite indicator which may be clamped to a fishing rod at any point along the rod. The indicator is substantially completely independent of the structure of the rod and, for this reason, it may be used without any modification of the rod structure. In order to facilitate the use of my indicator for night fishing, it may be provided with a light which is lighted when the indicator is tripped by a fish taking the bait. Additionally, the trip mechanism of my indicator is constructed in a manner to make it extremely sensitive so as not to interfere with the normal running of the line after the fish strikes the bait.

In the accompanying drawings, I have shown one preferred embodiment of my invention in which.

Figure 1:
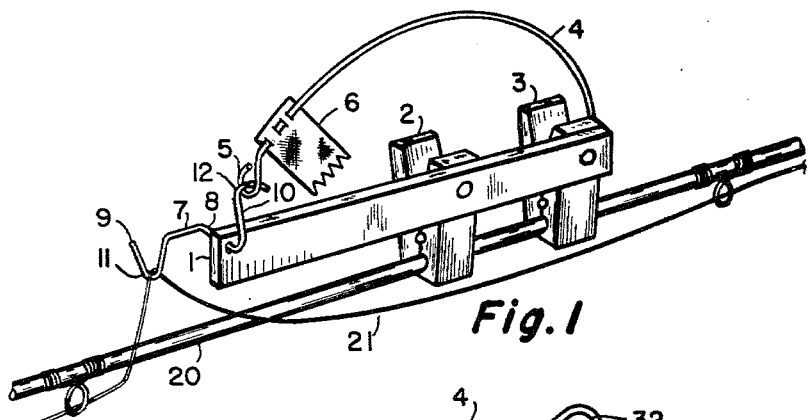
FIGURE 1 is a perspective view of a bite indicator in accordance with the invention mounted on a fishing rod.

The bite indicator consists of a body portion 1 made of a light-weight metal such as aluminum, although any other light-weight metal may be used with equal facility. A pair of clamps 2 and 3 are attached to the body portion by means of rivets. Any well-known type of spring clamp may be used and it is possible to use a single clamp, rather than a pair of clamps as shown, so long as the clamp is sufficiently long to encompass enough of the rod to hold the bite indicator in a stable position. The spring loading of the clamps must be sufficient to hold the device firmly on the fishing rod and yet the clamps must be sufficiently yielding to permit the person using the indicator to quickly mount it on and remove it from the rod as desired.

A flexible flag support member 4 is affixed at one of its ends to the rivet holding the clamp 3 on the body portion. The member 4 may be made of a wire or a piece of spring steel and it must have sufficient elasticity to permit it to snap into a vertical position from the bent position shown in FIGURES 1 and 2. Stainless steel has been found to be a good material for the flag support member, as it resists rust and corrosion which, as the device is used near the water, may be a problem. The end of member 4 which is not affixed to the clamp is bent in the shape of a loop 5. A flag 6 is attached to member 4 adjacent loop 5 in order that a fisherman may see whether or not the support member is in its upright position from a distance, thereby enabling him to check a plurality of rods from one station.

Figure 3:
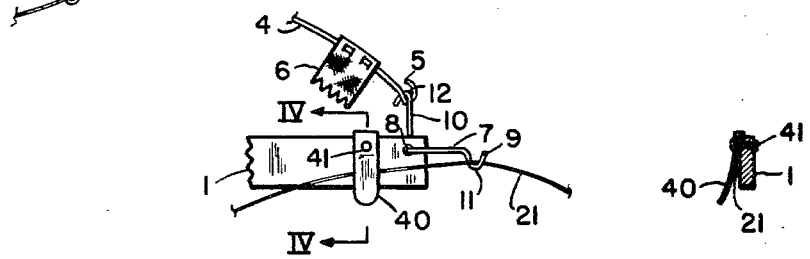
FIGURE 3 is a fragmentary elevational view of the body portion showing the line held by the tension spring.

The end of body portion 1 opposite the end to which clamp 3 is affixed has a hole drilled therethrough. The diameter of this hole is large enough to permit trip member 7 to freely rotate therein. The trip member consists of a center section 8 which extends through the hole and lies transversely to the body portion 1 and a pair of end sections 9 and 10. As shown in the drawings, each of the end sections 9 and 10 has a straight portion extending at right angles to the center section 8 and hooks 11 and 12 are formed at the ends of the straight portions. The straight portions of the end sections are shown in FIG. 3 as being substantially 90° with respect to each other in the manner of the legs of a right triangle. However, it should be understood that the sections may be arranged at an angle other than 90° without altering the operation of the trip member.

Figure 2:
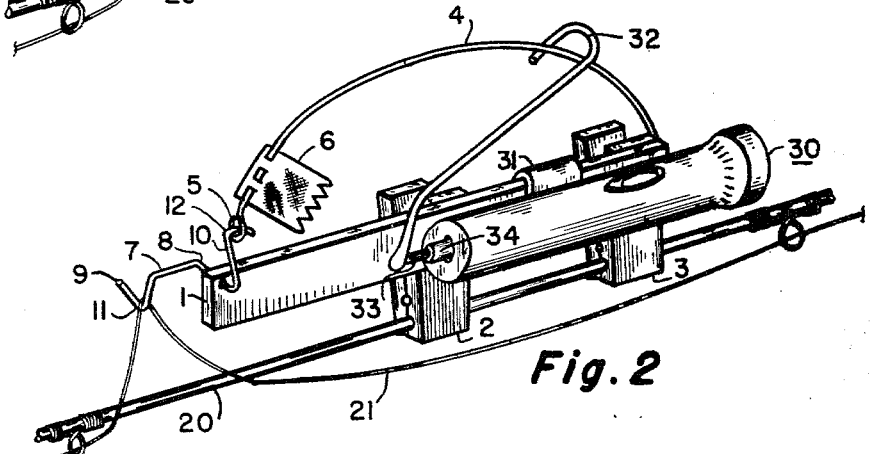
FIGURE 2 is a view similar to FIGURE 1 showing a light attachment on the indicator to adapt it for night fishing.

When the bite indicator is in the set position shown in FIGURES 1 and 2, the member 4 is bent toward the trip member and the loop 5 is hooked on the rearwardly facing L-shaped hook 12. The U-shaped hook 11 faces upwardly when the trip member is set in order to permit the line of the fishing rod to pass thereover.

Figure 4:
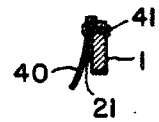
FIGURE 4 is a section view on line IV—IV of FIGURE 3.

The body portion is provided with a tensioning leaf spring 40 adjacent to the trip member as shown in FIG. 3. The leaf spring is affixed to the body portion by a rivet 41 and, as shown in FIGURE 4, a V-shaped notch is provided between the body portion and the opposed surface of spring 40.

My bite indicator is clamped along the fishing rod 20 wherever desired and operates in the following manner. The loop 5 is hooked onto the hook 12 and the line 21 is passed over the hook 11. When a fish strikes the bait attached to the end of the line, the line becomes taut and a downward force is exerted on hook 11 by the line. The force on hook 11 causes the trip member to rotate in a counterclockwise direction about the center section 8 which acts as an axle and the hook 12 moves rearwardly to release the loop 5 of the flag support member 4 at the same time permitting the line to fall off hook 11. When the loop is released, the member 4 snaps into an upright position and the flag may be easily seen by the fisherman indicating that a fish has struck the bait.

When the bite indicator is used in conjunction with a spinning reel or a spin-casting reel with its bail open to permit free stripping of the line, it is desirable to run the line through the V-shaped notch formed by spring 40 and body portion 1. By running the line through the notch prior to passing it over hook 11 in the manner shown in FIGURE 3, it is certain that the line will be sufficiently tensioned when a fish strikes the bait to rotate the trip lever and to release member 4 so that it can snap upwardly. As soon as the trip member is rotated, the line will fall away from hook 11 and the V-shaped notch and the fish can run with the bait.

The device shown in FIGURE 2 includes a visual signaling means to indicate a bite or strike at night. The signaling means includes a flashlight 30 which has a metal casing supporting a battery (not shown) and a plastic cap screwed onto its open or forward end. The cap is shown in FIGURE 2 of the drawings as being located at the enlarged end of the casing. A lens is held in the forward end of the cap, and a common metal reflector projects into the metal casing from the rear end of the cap. A bulb is supported in the reflector with its base extending through an opening in the reflector so that its contact point is located in the casing in contact with the contact point of the battery. A switch member is located within the casing, and may be moved forwardly into contact with the metal reflector and rearwardly into inoperative position by means of the slide which is shown on the casing in FIGURE 2. A metal spring clip 31 is attached to the side of the casing to hold the light on the body portion 1. It is readily apparent that this description is applicable to any common flashlight.

The normally closed rear end of the metal casing has a central opening formed therein, and an insulator sleeve 34 extends through this opening. A metal shaft 33 is fixed within the sleeve and passes completely through the sleeve so that the end of the shaft within the casing contacts the rear end of the battery. The end of the shaft 33 outside the casing is attached to the enlarged end of a lever 32 by means of a pivot pin (not shown) and the free end of the lever 32 is provided with a hook. Since the lever 32 and shaft 33 are attached by a pivot pin the lever can swing about the end of the shaft and since the insulator sleeve which supports the shaft is mounted in the end of the casing for rotary motion the lever and shaft can be rotated to position the hook on the lever above body portion 1. After the light is clipped to the body portion, the spring member 4 is bent and attached to the trip member and the hook end of lever 32 is rotated and pivoted into position over member 4 as shown in FIGURE 2. The line 21 is then passed over the hook 11 on the trip member.

When a fish takes the bait the line becomes taut, and the hook 11 rotates downwardly, thereby rotating the hook 12 to release the loop 5 and permit the member 4 to snap upwardly. The member 4 will move upwardly until it is stopped by contact with the hook on lever 32. Assuming the slide and switch member are in the operative position the contact between lever 32 and member 4 completes a circuit including the battery, the shaft 33, the lever 32, the member 4, the body portion 1, the clip 31, the flashlight casing, the switch member, the metal reflector, and the bulb in the flashlight and the bulb is lighted to indicate that a fish has taken the bait.

My invention has important features which include its easy adaptability for use with substantially any type of fishing rod and reel, regardless of the rod and reel construction. Furthermore, my bite indicator is a unitary device and, hence, can be placed at any point along the length of the rod and, therefore, will not interfere with the normal use of the rod. The indicator of my invention is specially adapted for night fishing by using the flashlight attachment therewith and when used in daylight, the flashlight is easily removable to make the bite indicator as light as possible.

While I have shown and described a preferred embodiment of my invention, it may be otherwise embodied within the scope of the appended claims.

I claim:

1. A self-contained bit indicator for a fishing rod including a longitudinal body portion having a pair of clamps attached thereto for holding the indicator above the rod; a spring member affixed at one end of said body portion and a trip member rotatably mounted at the opposite end of said body portion; said spring member having a loop formed in its unattached end; said trip member consisting of a center section supported in said body portion and two end sections arranged perpendicular to said center section and lying on opposite sides of said body portion, each of said end sections having a hook adjacent its end, one of said hooks receiving the loop on said spring member when the indicator is in the set position and the other of said hooks adapted to receive a line on the rod when the indicator is in the set position, whereby a tensioning of the line rotates said trip member releasing said loop and permitting said spring member to snap into an upright position indicating that a fish has struck the bait.

2. A bite indicator as set forth in claim 1 including a flag attached to said spring member adjacent the loop.

3. A bite indicator as set forth in claim 1 wherein said end sections of said trip member are arranged at an angle with respect to each other, and said hook for receiving said loop opening toward said one end of said body and said hook for receiving said line opening substantially upwardly away from the rod when the indicator is in the set position.

4. A bite indicator as set forth in claim 1 including a tensioning spring affixed to said body portion adjacent the trip member and on the same side of said body portion as said line receiving hook, said tensioning spring being shaped to cooperate with the body portion to form a downwardly opening V-shaped notch for receiving the line of a rod to which the indicator is attached, whereby the notch holds the line firmly until it is tensioned by a fish striking the bait at which time the line receiving hook and notch release the line.

5. A bite indicator as in claim 1 wherein said spring member and body member are made of metal and including a light means attached to said body portion for night fishing, said light means comprising a flashlight having an axis and including a battery and a bulb and having a metal spring clip affixed to its side for removably holding it on said body portion and a metal contact lever extending from its end, said contact lever having a free end formed in the shape of a hook, said contact lever being mounted for rotary movement about the axis of said flashlight and for pivotal movement in a plane including the axis of said flashlight so that said hook shaped end can be positioned in the plane of the spring member for contact with said spring member when it snaps upwardly indicating a bite, whereby a circuit is completed through said spring member, said contact member, said body portion and clip and including the battery and bulb of said flashlight to light said bulb to indicate a bite when said spring member and contact lever are in contact.

6. A unitary bite indicator including an elongated body portion adapted to lie along the axis of a fishing rod and a clamping means for holding said body portion on the rod; a spring member affixed to one end of said body portion and a trip member rotatably mounted at the opposite end of said body portion, said trip member including a first hook for holding said spring member in a stressed position and a second hook for freely supporting a fishing line; light means removably supported on said body portion, said light means including a bulb, a battery and a contact lever, said contact lever having a free end formed in the shape of a hook and said hook shaped end being positioned in the plane of said spring member, whereby rotation of said trip member in response to tension on the line releases said spring member thereby permitting said spring member to contact said hook shaped end of said contact member and complete a circuit including said battery and said bulb to light said bulb.

References Cited by the Examiner

UNITED STATES PATENTS

| 667,932 | 2/01 | Dwigans | 43—16 |
| 1,162,257 | 11/15 | Ruggles | 43—17 |
| 2,032,537 | 3/36 | Kozikowski | 43—16 |
| 2,196,784 | 4/40 | Simmons et al. | 43—17 |
| 2,638,696 | 5/53 | Derkovitz | 43—15 |
| 2,834,140 | 5/58 | Knier | 43—17 |

SAMUEL KOREN, Primary Examiner.

JOSEPH S. REICH, ABRAHAM G. STONE, Examiners.